(12) United States Patent
Tang (10) Patent No.: US 11,405,955 B2
(45) Date of Patent: Aug. 2, 2022

(54) METHOD AND DEVICE FOR SIGNAL TRANSMISSION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/992,307

(22) Filed: Aug. 13, 2020

(65) Prior Publication Data

US 2020/0374929 A1 Nov. 26, 2020

Related U.S. Application Data

(63) Continuation of application No. PCT/CN2018/076892, filed on Feb. 14, 2018.

(51) Int. Cl.
*H04W 74/08* (2009.01)
*H04W 16/14* (2009.01)
*H04W 52/24* (2009.01)

(52) U.S. Cl.
CPC ....... *H04W 74/0808* (2013.01); *H04W 16/14* (2013.01); *H04W 52/245* (2013.01)

(58) Field of Classification Search
None
See application file for complete search history.

(56) References Cited

U.S. PATENT DOCUMENTS

| 8,014,730 B2 | 9/2011 | Moulsley |
| 9,807,710 B2 | 10/2017 | Seo et al. |
| 2008/0144493 A1* | 6/2008 | Yeh .................. H04W 74/0816 370/230 |
| 2009/0104879 A1 | 4/2009 | Moulsley |
| 2011/0086664 A1 | 4/2011 | Li |

(Continued)

FOREIGN PATENT DOCUMENTS

| CN | 101057415 A | 10/2007 |
| CN | 101466133 A | 6/2009 |

(Continued)

OTHER PUBLICATIONS

International Search Report in the international application No. PCT/CN2018/076892, dated Oct. 26, 2018.

(Continued)

*Primary Examiner* — Hong Shao
(74) *Attorney, Agent, or Firm* — Perkins Coie LLP (57) ABSTRACT

A method and device for signal transmission are provided. The method includes that: a receiving node receives a request-to-send (RTS) signal from a sending node; the receiving node determines a sending power and/or a signal format of a clear-to-send (CTS) signal; and the receiving node sends, according to the sending power and/or the signal format, the CTS signal to the sending node. Accordingly, after the sending node sends the RTS signal to the receiving node, the receiving node can determine the sending power and/or the signal format of the RTS signal, and send the CTS signal to the sending node based on the sending power and/or the signal format.

8 Claims, 3 Drawing Sheets

(56) References Cited

U.S. PATENT DOCUMENTS

| | | | |
|---|---|---|---|
| 2015/0117233 A1 | 4/2015 | Wong et al. | |
| 2015/0327189 A1 | 11/2015 | Seo et al. | |
| 2016/0081042 A1* | 3/2016 | Choudhury | H04W 24/02 |
| | | | 370/252 |
| 2016/0366702 A1* | 12/2016 | Baba | H04L 12/413 |
| 2017/0164371 A1 | 6/2017 | Kim et al. | |
| 2018/0152967 A1 | 5/2018 | Zhang et al. | |

FOREIGN PATENT DOCUMENTS

| | | |
|---|---|---|
| CN | 102833792 A | 12/2012 |
| CN | 104956740 A | 9/2015 |
| CN | 107645787 A | 1/2018 |
| KR | 20090041048 A | 4/2009 |
| WO | 2016192595 A1 | 12/2016 |

OTHER PUBLICATIONS

Supplementary European Search Report in the European application No. 18906097.3, dated Dec. 21, 2020.
Written Opinion of the International Search Authority in the international application No. PCT/CN2018/076892, dated Oct. 26, 2018.

* cited by examiner

METHOD AND DEVICE FOR SIGNAL TRANSMISSION

CROSS-REFERENCE TO RELATED APPLICATION

This application is a continuation of International Patent Application No. PCT/CN2018/076892 filed on Feb. 14, 2018, the entire content of which is incorporated herein by reference for all purposes.

TECHNICAL FIELD

Embodiments of the disclosure relate to the field of communication, and more particularly to a method and device for signal transmission.

BACKGROUND

Data transmission in an unlicensed frequency band is supported in a 5th-Generation (5G) system. A sending node may send a sending signal to a receiving node to request communication with the receiving node. The receiving node may return a signal to the sending node to indicate that the sending node may transmit data to the receiving node. The sending node can transmit data to the receiving node only when receiving the signal returned by the receiving node. When there are interference signals around, the sending node cannot receive the signal returned by the sending node, thereby affecting subsequent data transmission. How to improve the performance of signal transmission between a sending node and a receiving node in an unlicensed frequency band is a problem urgent to be solved.

SUMMARY

A first aspect provides a method for signal transmission, which may include that: a receiving node receives a request-to-send (RTS) signal from a sending node; the receiving node determines a sending power and/or a signal format of a clear-to-send (CTS) signal; and the receiving node sends the CTS signal to the sending node according to the sending power and/or the signal format.

A second aspect provides a method for signal transmission, which may include that: a sending node sends an RTS signal to a receiving node; and the sending node detects a CTS signal from the receiving node according to at least two channel formats.

A third aspect provides a receiving node, which includes a processor and a transceiver connected to the processor to implement the operations of the receiving node in the first and second aspects.

A fourth aspect provides a sending node, which includes a processor and a transceiver connected to the processor to implement the operations of the sending node in the first and second aspects.

DETAILED DESCRIPTION

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
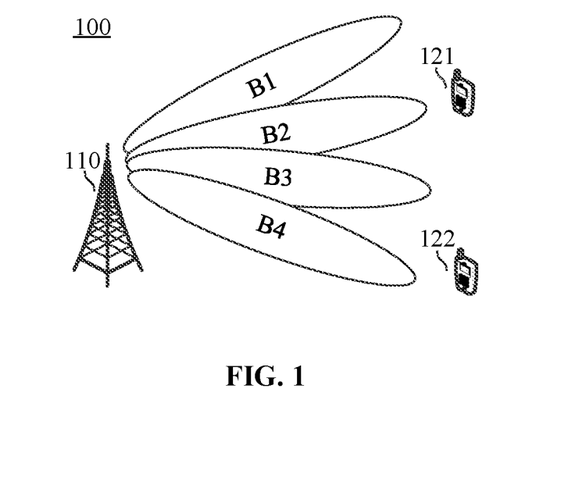
FIG. 1 is a schematic diagram of a wireless communication system to which the embodiments of the disclosure are applied.

FIG. 1 illustrates a wireless communication system 100 to which the embodiments of the disclosure are applied. The wireless communication system 100 may include a network device 110. The network device 100 may be a device for communicating with a terminal device. The network device 100 may provide communication coverage for a specific geographical region and may communicate with a terminal device (for example, user equipment (UE)) in the coverage. Optionally, the network device 100 may be a base transceiver station (BTS) in the GSM or the CDMA system, or may be a nodeB (NB) in the WCDMA system, or may be an evolutional node B (eNB or eNodeB) in the LTE system or a wireless controller in a cloud radio access network (CRAN). Or the network device may be a relay station, an access point, a vehicle device, a wearable device, a network-side device in a future 5G network, a network device in a future evolved Public Land Mobile Network (PLMN) or the like.

The wireless communication system 100 may further include at least one terminal device such as a terminal device 121 and a terminal device 122 within the coverage of the network device 110. The terminal device 121 and the terminal device 122 may be mobile or fixed. Optionally, the terminal device 121 and the terminal device 122 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like. Optionally, the terminal device 121 and the terminal device 122 may perform Device to Device (D2D) communication.

A network device and two terminal devices are exemplarily shown in FIG. 1. Optionally, the wireless communication system 100 may include multiple network devices. Another number of terminal devices may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

In a 5G system, a frequency band configured for data transmission is higher than a frequency band configured in LTE, so the path loss of wireless signal transmission may increase and the coverage of a wireless signal may decrease. To this end, a beamforming technology is proposed in the 5G system to increase the gain of a wireless signal, thereby making up for the path loss. Specifically, a beam configured by a BTS to send a signal to a terminal device has directivity. Different beams actually correspond to different transmission directions. Each narrow beam can only cover part of a cell area rather than all areas in the cell. For example, FIG. 1 shows four beams in different directions, that is, beam B1, beam B2, beam B3 and beam B4. The BTS may transmit signals to the terminal device through the four beams in different directions. Beam B1 and beam B2 can cover the terminal device 121 instead of the terminal device 122. Beam B3 and beam B4 can cover the terminal device 122 instead of the terminal device 121. The BTS may send a signal to the terminal device 121 through beam B1 and beam B2, and send a signal to the terminal device 122 through beam B3 and beam B4.

The following briefly introduces a listen before talk (LBT) mechanism in unlicensed frequency bands involved in the embodiments of the disclosure, and an RTS/CTS mechanism working in a Wireless Fidelity (WiFi) system in the unlicensed frequency bands.

In the 5G system, data transmission in the unlicensed frequency bands is supported. Data transmission using the unlicensed frequency bands is based on the LBT mechanism. That is, before sending data, a sending node needs to sense whether a channel is idle, and can send data only after determining that the channel is idle.

In addition, for the WiFi system working in the unlicensed frequency bands, in order to solve the problem on hidden nodes, the RTS/CTS mechanism is proposed. Hidden stations mean that BTS A sends a signal to BTS B, and BTS C may also send a signal to BTS B when BTS A is not detected. Therefore, BTS A and BTS C can simultaneously send signals to BTS B, causing signal collision, which may eventually cause the signals sent to BTS B to be lost. This problem can be solved through the RTS/CTS mechanism. During the use of RTS/CTS, if an upper limit of the number of bytes to be transmitted is set, then once data to be transmitted is greater than the upper limit, an RTS/CTS handshake protocol may be started. First, BTS A may send an RTS signal to BTS B, indicating that BTS A is to send some data to BTS B. BTS B may send a CTS signal after receiving the RTS signal, indicating that BTS B is ready and BTS A may send data. The rest BTSs that are to send data to BTS B can suspend sending data to BTS B. In this way, real data transfer can start only after the two parties successfully exchange the RTS/CTS signals (that is, the handshake is completed), which ensures that when multiple invisible sending nodes send signals to the same receiving node at the same time, only the node that receives the CTS signal returned by the receiving node can transmit data to the receiving node, thereby avoiding conflicts.

The sending node can transmit data to the receiving node only when receiving the CTS signal returned by the receiving node. When there are interference signals around, the sending node cannot receive the CTS signal returned by the sending node, thereby affecting subsequent data transmission. How to improve the performance of signal transmission between a sending node and a receiving node in an unlicensed frequency band is a problem urgent to be solved.

In the embodiments of the disclosure, after the sending node sends the RTS signal to the receiving node, the receiving node can determine the sending power and/or the signal format of the RTS signal, and send the CTS signal to the sending node based on the sending power and/or the signal format. The sending node can detect the CTS signal based on the signal format, thereby improving the performance of signal transmission between the sending node and the receiving node.

It is to be understood that, in the embodiments of the disclosure, a beam configured to receive a signal can be understood as a spatial domain reception filter configured to receive a signal; and a beam configured to send a signal can be understood as a spatial domain transmission filter configured to send a signal. Two signals sent using the same spatial domain transmission filter may be referred to be quasi-co-located (QCL) with respect to spatial reception parameters.

Figure 2:
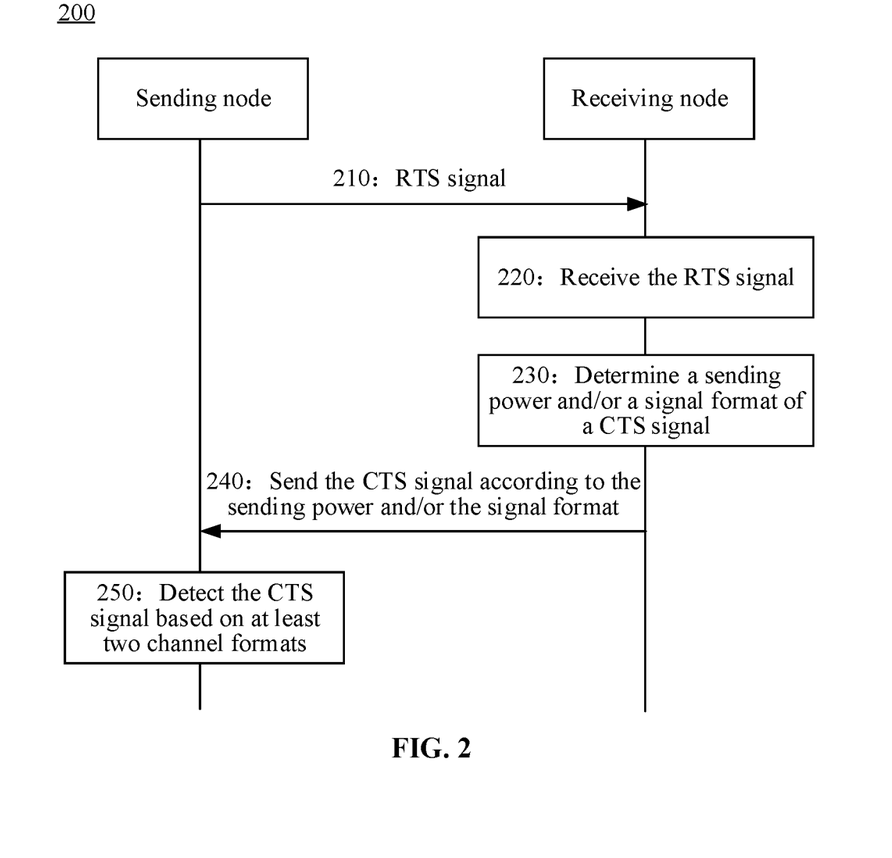
FIG. 2 is a flowchart of a method for signal transmission according to an embodiment of the disclosure.

FIG. 2 is a flowchart of a method for signal transmission according to an embodiment of the disclosure. A sending node and a receiving node shown in FIG. 2 may be, for example, the network device 110, the terminal device 121 or the terminal device 122 shown in FIG. 1. The method shown in FIG. 2 may be, for example, applied to unlicensed frequency bands. As shown in FIG. 2, the method for signal transmission may include some or all of the following contents.

In 210, the sending node sends an RTS signal to the receiving node.

In 220, the receiving node receives the RTS signal from the sending node.

In 230, the receiving node determines a sending power and/or a signal format of a CTS signal.

Optionally, the RTS signal may be at least configured to request channel transmission with the receiving node. For example, an address of the receiving node, the time of a data frame, the time of sending ACK and so on may be included. The RTS signal can also carry other content or have other functions, which is not limited here.

Optionally, the CTS signal may be at least configured to indicate permission of channel transmission between the sending node and the receiving node, or, prohibition of data transmission between other nodes and the receiving node. The CTS signal can also include other content or have other functions, which is not limited here.

In particular, in the WIFI system, the sending request signal is an RTS signal, and the sending permission signal is a CTS signal.

In 240, the receiving node sends the CTS signal to the sending node according to the sending power and/or the signal format.

Optionally, the operation that the receiving node determines the sending power of the CTS signal may include that: the receiving node performs carrier sensing (or beam sensing, channel sensing, sensing, etc.); responsive to that a sensed channel power is less than a first threshold, the receiving node determines the sending power of the CTS signal as a first sending power; and responsive to that a sensed channel power is greater than a first threshold, the receiving node determines the sending power of the CTS signal as a second sending power, the second sending power being less than the first sending power.

The second threshold may be greater than the first threshold, or the second threshold may be less than the first threshold.

In unlicensed frequency bands, the receiving node may perform carrier sensing (for example, perform directional sensing on one or more beams), and set a sending power of the CTS signal based on the result of sensing. For example, responsive to sensing that other adjacent nodes have a higher signal sending power, the receiving node may set a lower sending power to send the CTS signal, thereby preventing impact on data being transmitted by other nodes. Responsive to sensing that other adjacent nodes have a lower signal sending power, the receiving node may be farther away from other nodes or other nodes are not transmitting data at this moment, so the receiving node may set a higher sending power to send the CTS signal, thereby ensuring the transmission performance of the CTS signal.

Optionally, the operation that the receiving node determines the signal format of the CTS signal may include that: responsive to that the sending power of the CTS signal is the first sending power, the receiving node determines the signal format of the CTS signal as a first signal format; and responsive to that the sending power of the CTS signal is the second sending power, the receiving node determines the signal format of the CTS signal as a second signal format, a time domain length occupied by the second signal format being greater than a time domain length occupied by the first signal format.

In other words, when the receiving node may send the CTS signal using a higher sending power, the receiving node may send the CTS signal using a short-time signal format. Otherwise, when the receiving node needs to send the CTS signal using a lower sending power, the receiving node may send the CTS signal using a long-time signal format.

There may be at least two signal formats for transmitting the CTS signal, and the receiving node may set the sending power of the CTS signal according to the result of carrier sensing and select an appropriate signal format. For example, at least two power ranges may be pre-configured, and each power range may correspond to a signal format. When the sending power set by the receiving node falls within a certain power range, the signal format corresponding to this power range may be configured for transmission.

Figure 3:
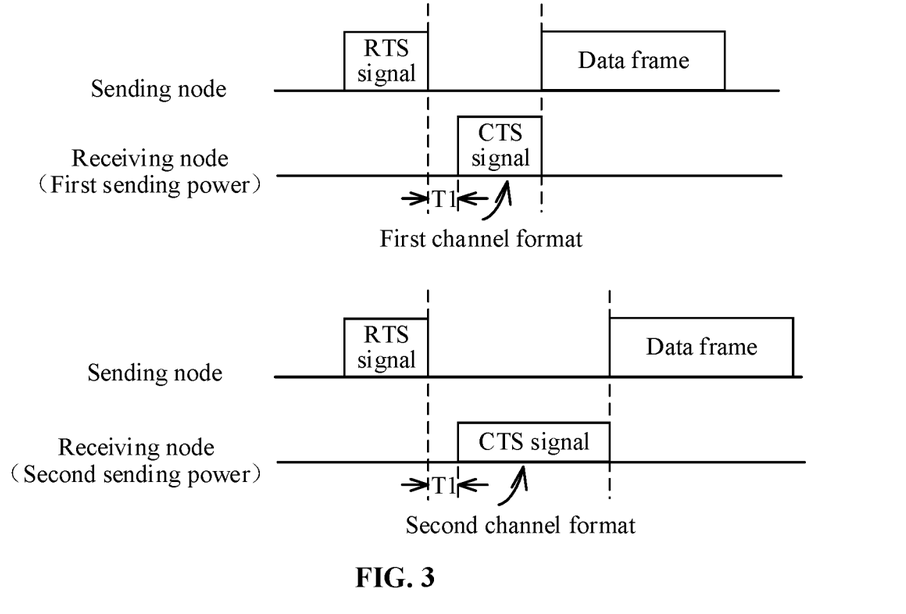
FIG. 3 is a schematic block diagram of a channel format of a CTS signal according to an embodiment of the disclosure.

For example, as shown in FIG. 3, it is assumed that the sending request signal is the RTS signal and the sending permission signal is the CTS signal. When the sending node sends the CTS signal with a first sending power, the signal format configured to send the CTS signal is a first signal format. When the sending node sends the CTS signal with a second sending power, the signal format configured to send the CTS signal is a second signal format. The first sending power is greater than the second sending power, and a time domain length of the second signal format is greater than a time domain length of the first signal format.

Figure 4:
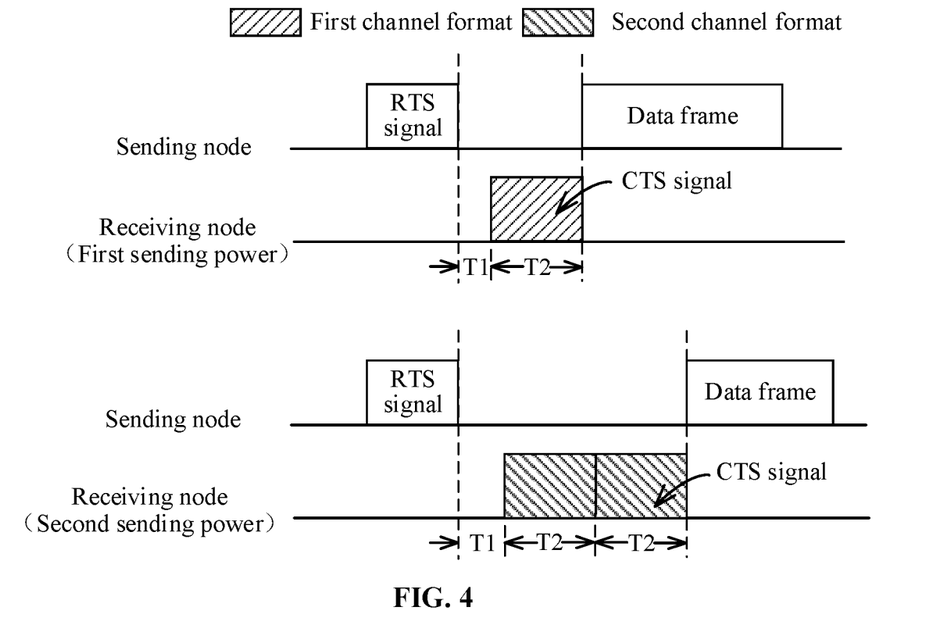
FIG. 4 is a schematic block diagram of a channel format of a CTS signal according to an embodiment of the disclosure.

Optionally, the second signal format may be a signal format formed after the first signal format is repeated N times in a time domain. For example, in the second signal format shown in FIG. 4, it is assumed that N=2. T1 is a time interval between a sending time of the CTS signal and a sending time of the RTS signal. T2 is a time domain length of the first channel format.

In 250, the sending node detects, according to at least two channel formats, a CTS signal from the receiving node.

Since the sending node neither knows additional channel occupancy and interference situations of the receiving node nor knows a channel format with which the receiving node sends the CTS signal, the sending node needs to blindly detect the CTS signal based on all possible channel formats.

Optionally, the at least two channel formats may include a first channel format and a second channel format, and a time domain length of the second signal format is greater than a time domain length of the first signal format.

When the receiving node sends the CTS signal with a first sending power, the signal format of the CTS signal is the first channel format, and when the receiving node sends the CTS signal with a second sending power, the signal format of the CTS signal is the second channel format, the second sending power being less than the first sending power.

Optionally, as shown in FIG. 3, there may be a time interval T1 between a sending time of the CTS signal and a sending time of the RTS signal.

For example, T1=16 us, or, T1=25 us.

It is to be understood that, in each embodiment of the disclosure, a magnitude of a sequence number of each process does not mean an execution sequence. The execution sequence of each process should be determined by its function and an internal logic and should not form any limit to an implementation process of the embodiments of the disclosure.

The method for signal transmission according to the embodiments of the disclosure is described above in detail. A device according to the embodiments of the disclosure will be described below in combination with FIG. 5 to FIG. 8. The technical characteristics described in the method embodiments are applied to the following device embodiments.

Figure 5:
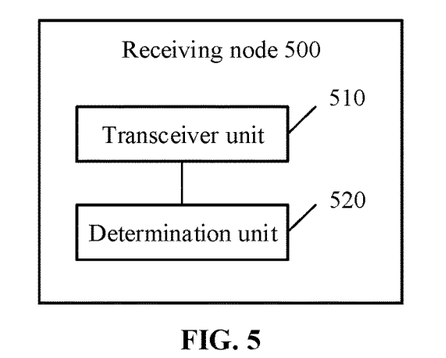
FIG. 5 is a schematic block diagram of a receiving node according to an embodiment of the disclosure.

FIG. 5 is a schematic block diagram of a receiving node 500 according to an embodiment of the disclosure. As shown in FIG. 5, the receiving node 500 includes a transceiver unit 510 and a determination unit 520.

The transceiver unit 510 is configured to receive an RTS signal from a sending node.

The determination unit 520 is configured to determine a sending power and/or a signal format of a CTS signal.

The transceiver unit 510 is further configured to send the CTS signal to the sending node according to the sending power and/or the signal format determined by the determination unit 520.

Accordingly, after the sending node sends the RTS signal to the receiving node, the receiving node can determine the sending power and/or the signal format of the RTS signal, and send the CTS signal to the sending node based on the sending power and/or the signal format. The sending node can detect the CTS signal based on the signal format, thereby improving the performance of signal transmission between the sending node and the receiving node.

Optionally, the RTS signal is configured to request data transmission between the sending node and the receiving node, and the CTS signal is configured to indicate permission of the data transmission between the sending node and the receiving node.

Optionally, the transceiver unit 510 is further configured to perform carrier sensing.

The determination unit 520 is specifically configured to: determine, responsive to that a sensed channel power is less than a first threshold, the sending power of the CTS signal as a first sending power; and determine, responsive to that a sensed channel power is greater than a first threshold, the sending power of the CTS signal as a second sending power, the second sending power being less than the first sending power.

Optionally, the determination unit 520 is further configured to: determine, responsive to that the sending power of the CTS signal is the first sending power, the signal format of the CTS signal as a first signal format; and determine, responsive to that the sending power of the CTS signal is the second sending power, the signal format of the CTS signal as a second signal format, a time domain length of the second signal format being greater than a time domain length of the first signal format.

Optionally, the second signal format may be a signal format formed after the first signal format is repeated N times in a time domain.

Optionally, there may be a time interval T1 between a sending time of the CTS signal and a sending time of the RTS signal.

It is to be understood that the receiving node 500 may execute the corresponding operations, executed by the receiving node, in the method 200. For similarity, no more elaborations will be made herein.

Figure 6:
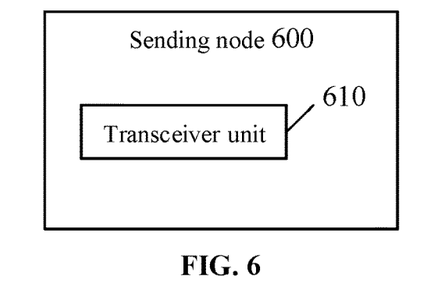
FIG. 6 is a schematic block diagram of a sending node according to an embodiment of the disclosure.

FIG. 6 is a schematic block diagram of a sending node 600 according to an embodiment of the disclosure. As shown in FIG. 6, the sending node 600 includes a transceiver unit 610, configured to send an RTS signal to a receiving node, and detect, according to at least two channel formats, a CTS signal from the receiving node.

Accordingly, after the sending node sends the RTS signal to the receiving node, the receiving node can determine the sending power and/or the signal format of the RTS signal, and send the CTS signal to the sending node based on the sending power and/or the signal format. The sending node can detect the CTS signal based on the signal format, thereby improving the performance of signal transmission between the sending node and the receiving node.

Optionally, the RTS signal is configured to request data transmission between the sending node and the receiving node, and the CTS signal is configured to indicate permission of the data transmission between the sending node and the receiving node.

Optionally, the at least two channel formats may include a first channel format and a second channel format, a time domain length of the second signal format is greater than a time domain length of the first signal format. When the receiving node sends the CTS signal with a first sending power, the signal format of the CTS signal is the first channel format. When the receiving node sends the CTS signal with a second sending power, the signal format of the CTS signal is the second channel format, and the second sending power is less than the first sending power.

Optionally, the second signal format may be a signal format formed after the first signal format is repeated N times in a time domain.

Optionally, there may be a time interval T1 between a sending time of the CTS signal and a sending time of the RTS signal.

It is to be understood that the sending node 600 may execute the corresponding operations, executed by the sending node, in the method 200. For similarity, no more elaborations will be made herein.

Figure 7:
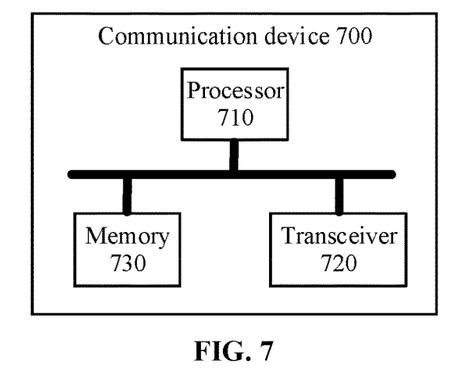
FIG. 7 is a schematic structure diagram of a communication device according to an embodiment of the disclosure.

FIG. 7 is a schematic structure diagram of a communication device 700 according to an embodiment of the disclosure. As shown in FIG. 7, the communication device includes a processor 710, a transceiver 720 and a memory 730. The processor 710, the transceiver 720 and the memory 730 can communicate with one another through an internal connecting path. The memory 730 is configured to store instructions, and the processor 710 is configured to execute the instructions stored in the memory 730 to control the transceiver 720 to receive a signal or send a signal.

Optionally, the processor 710 may call program codes stored in the memory 730 to execute corresponding operations, executed by the sending node, in the method 200. For similarity, no more elaborations will be made herein.

Optionally, the processor 710 may call program codes stored in the memory 730 to execute corresponding operations, executed by the receiving node, in the method 200. For similarity, no more elaborations will be made herein.

It is to be understood that the processor in the embodiments of the disclosure may be an integrated circuit chip and has a signal processing capability. In an implementation process, each operation of the method embodiment may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium may be arranged in a memory, and the processor can read information in the memory, and complete the operations of the methods in combination with hardware.

It can be understood that the memory in the embodiments of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is configured as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 8:
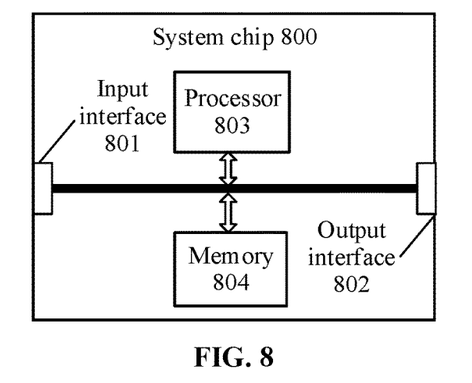
FIG. 8 is a schematic structure diagram of a system chip according to an embodiment of the disclosure.

FIG. 8 is a schematic structure diagram of a system chip according to an embodiment of the disclosure. The system chip 800 of FIG. 8 includes an input interface 801, an output interface 802, at least one processor 803 and a memory 804. The input interface 801, the output interface 802, the processor 803 and the memory 804 are connected with one another through an internal connecting path. The processor 803 is configured to execute codes in the memory 804.

Optionally, when the codes are executed, the processor 803 may implement corresponding operations, executed by the sending node, in the method 200. For simplicity, no more elaborations will be made herein.

Optionally, when the codes are executed, the processor 803 may implement corresponding operations, executed by the receiving node, in the method 200. For simplicity, no more elaborations will be made herein.

As described above, the technical solution of the present disclosure is proposed from these aspects below.

A first aspect provides a method for signal transmission, which may include that: a receiving node receives a request-to-send (RTS) signal from a sending node; the receiving node determines a sending power and/or a signal format of a clear-to-send (CTS) signal; and the receiving node sends the CTS signal to the sending node according to the sending power and/or the signal format.

Accordingly, after the sending node sends the RTS signal to the receiving node, the receiving node can determine the sending power and/or the signal format of the RTS signal, and send the CTS signal to the sending node based on the sending power and/or the signal format. The sending node can detect the CTS signal based on the signal format, thereby improving the performance of signal transmission between the sending node and the receiving node.

In a possible implementation mode, the RTS signal may be at least configured to request data transmission between the sending node and the receiving node, and the CTS signal may be at least configured to indicate permission of the data transmission between the sending node and the receiving node.

In a possible implementation mode, the operation that the receiving node determines the sending power of the CTS signal may include that: the receiving node performs carrier sensing; responsive to that a sensed channel power is less than a first threshold, the receiving node determines the sending power of the CTS signal as a first sending power; and responsive to that a sensed channel power is greater than a first threshold, the receiving node determines the sending power of the CTS signal as a second sending power, the second sending power being less than the first sending power.

In a possible implementation mode, the operation that the receiving node determines the signal format of the CTS signal may include that: responsive to that the sending power of the CTS signal is the first sending power, the receiving node determines the signal format of the CTS signal as a first signal format; and responsive to that the sending power of the CTS signal is the second sending power, the receiving node determines the signal format of the CTS signal as a second signal format, a time domain length of the second signal format being greater than a time domain length of the first signal format.

In a possible implementation mode, the second signal format may be a signal format formed after the first signal format is repeated N times in a time domain.

In a possible implementation mode, there may be a time interval T1 between a sending time of the CTS signal and a sending time of the RTS signal.

A second aspect provides a method for signal transmission, which may include that: a sending node sends an RTS signal to a receiving node; and the sending node detects a CTS signal from the receiving node according to at least two channel formats.

Accordingly, after the sending node sends the RTS signal to the receiving node, the receiving node can determine the sending power and/or the signal format of the RTS signal, and send the CTS signal to the sending node based on the sending power and/or the signal format. The sending node can detect the CTS signal based on the signal format, thereby improving the performance of signal transmission between the sending node and the receiving node.

In a possible implementation mode, the RTS signal may be at least configured to request data transmission between the sending node and the receiving node, and the CTS signal may be at least configured to indicate permission of the data transmission between the sending node and the receiving node.

In a possible implementation mode, the at least two channel formats may include a first channel format and a second channel format, a time domain length of the second signal format may be greater than a time domain length of the first signal format. When the receiving node sends the CTS signal with a first sending power, a signal format of the CTS signal may be the first channel format, and when the receiving node sends the CTS signal with a second sending power, the signal format of the CTS signal may be the second channel format, and the second sending power may be less than the first sending power.

In a possible implementation mode, the second signal format may be a signal format formed after the first signal format is repeated N times in a time domain.

In a possible implementation mode, there may be a time interval T1 between a sending time of the CTS signal and a sending time of the RTS signal.

A third aspect provides a receiving node, which may execute the operations of the receiving node in the first aspect or any optional implementation mode of the first aspect. Specifically, a terminal device may include modular units configured to execute the operations of the receiving node in the first aspect or any optional implementation mode of the first aspect.

A fourth aspect provides a sending node, which may execute the operations of the sending node in the first aspect or any optional implementation mode of the first aspect. Specifically, a network device may include modular units configured to execute the operations of a sending node in the second aspect or any optional implementation mode of the second aspect.

A fifth aspect provides a receiving node, which includes a processor, a transceiver and a memory. The processor, the transceiver and the memory may communicate with one another through an internal connecting path. The memory is configured to store instructions, and the processor is configured to execute the instructions stored in the memory. When the processor executes the instructions stored in the memory, such execution enables the receiving node to execute the method in the first aspect or any possible implementation mode of the first aspect, or such execution enables the receiving node to implement the receiving node provided in the second aspect.

A sixth aspect provides a sending node, which includes a processor, a transceiver and a memory. The processor, the transceiver and the memory may communicate with one another through an internal connecting path. The memory is configured to store instructions. The processor is configured to execute the instructions stored in the memory. When the processor executes the instructions stored in the memory, such execution enables the sending node to execute the method in the second aspect or any possible implementation mode of the second aspect, or such execution enables the sending node to implement the sending node provided in the fourth aspect.

A seventh aspect provides a system chip, which includes an input interface, an output interface, a processor and a memory. The processor is configured to execute instructions stored in the memory. When the instruction is executed, the processor may implement the method in the first aspect or any possible implementation mode of the first aspect.

An eighth aspect provides a system chip, which includes an input interface, an output interface, a processor and a memory. The processor is configured to execute instructions stored in the memory. When the instruction is executed, the processor may implement the method in the second aspect or any possible implementation mode of the second aspect.

A ninth aspect provides a computer program product including instructions, which is run in a computer to enable the computer to execute the method in the first aspect or any possible implementation mode of the first aspect.

A tenth aspect provides a computer program product including instructions, which is run in a computer to enable the computer to execute the method in the second aspect or any possible implementation mode of the second aspect.

It is to be understood that, in the embodiments of the disclosure, "B corresponding to A" represents that B is associated with A and B may be determined according to A. It is also to be understood that determining B according to A does not mean that B is determined only according to A. B may also be determined according to A and/or other information.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific implementations and design constraints of the technical solutions. Professionals may realize the described functions for each specific implementation with different methods, but such realization shall fall within the scope of the disclosure.

Those skilled in the art may clearly learn about that the specific working process of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may be or may not be physically separated, and parts displayed as units may be or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a monitoring unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The above-mentioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for signal transmission, comprising:
receiving, by a receiving node, a request-to-send (RTS) signal from a sending node;
performing, by the receiving node, sensing on a channel between the receiving node and another node than the sending node;
determining, by the receiving node, a sending power of a clear-to-send (CTS) signal based on a sensed channel power; and
sending, by the receiving node, the CTS signal to the sending node according to the sending power,
wherein determining, by the receiving node, the sending power of the CTS signal based on the sensed channel power comprises:
responsive to that the sensed channel power is less than a first threshold, determining, by the receiving node, the sending power of the CTS signal as a first sending power; and
responsive to that the sensed channel power is greater than the first threshold, determining, by the receiving node, the sending power of the CTS signal as a second sending power, the second sending power being less than the first sending power,
wherein the method further comprising:
responsive to that the sending power of the CTS signal is the first sending power, determining, by the receiving node, a signal format of the CTS signal as a first signal format; and
responsive to that the sending power of the CTS signal is the second sending power, determining, by the receiving node, the signal format of the CTS signal as a second signal format, a time domain length of the second signal format being greater than a time domain length of the first signal format.

2. The method according to claim 1, wherein the RTS signal is at least configured to request data transmission between the sending node and the receiving node, and the CTS signal is at least configured to indicate permission of the data transmission between the sending node and the receiving node.

3. The method according to claim 1, wherein the second signal format is a signal format formed after the first signal format is repeated N times in a time domain, N being a positive integer greater than 1.

4. The method according to claim 1, wherein there is a time interval T1 between a sending time of the CTS signal and a sending time of the RTS signal.

5. A receiving node, comprising:
a transceiver, configured to receive a request-to-send (RTS) signal from a sending node and perform sensing on a channel between the receiving node and another node than the sending node; and
a processor, connected to the transceiver and configured to determine a sending power of a clear-to-send (CTS) signal based on a sensed channel power,
wherein the transceiver is further configured to send the CTS signal to the sending node according to the sending power determined by the processor,
wherein the processor is specifically configured to:
determine, responsive to that the sensed channel power is less than a first threshold, the sending power of the CTS signal as a first sending power; and
determine, responsive to that the sensed channel power is greater than a first threshold, the sending power of the CTS signal as a second sending power, the second sending power being less than the first sending power,
wherein the processor is further configured to:
determine, responsive to that the sending power of the CTS signal is the first sending power, a signal format of the CTS signal as a first signal format; and
determine, responsive to that the sending power of the CTS signal is the second sending power, the signal format of the CTS signal as a second signal format, a time domain length of the second signal format being greater than a time domain length of the first signal format.

6. The receiving node according to claim 5, wherein the RTS signal is at least configured to request data transmission between the sending node and the receiving node, and the CTS signal is at least configured to indicate permission of the data transmission between the sending node and the receiving node.

7. The receiving node according to claim 5, wherein the second signal format is a signal format formed after the first signal format is repeated N times in a time domain, N being a positive integer greater than 1.

8. The receiving node according to claim 5, wherein there is a time interval T1 between a sending time of the CTS signal and a sending time of the RTS signal.

* * * * *